US009519947B2

(12) United States Patent
Nickolls et al.

(10) Patent No.: US 9,519,947 B2
(45) Date of Patent: Dec. 13, 2016

(54) ARCHITECTURE AND INSTRUCTIONS FOR ACCESSING MULTI-DIMENSIONAL FORMATTED SURFACE MEMORY

(75) Inventors: John R. Nickolls, Los Altos, CA (US); Brian Fahs, Los Altos, CA (US); Lars Nyland, Carrboro, NC (US); John Erik Lindholm, Saratoga, CA (US); Richard Craig Johnson, Cary, NC (US)

(73) Assignee: NVIDIA Corporation, Santa Clara, CA (US)

( * ) Notice: Subject to any disclaimer, the term of this patent is extended or adjusted under 35 U.S.C. 154(b) by 456 days.

(21) Appl. No.: 12/890,171

(22) Filed: Sep. 24, 2010

(65) Prior Publication Data
US 2011/0074802 A1    Mar. 31, 2011

Related U.S. Application Data

(60) Provisional application No. 61/246,041, filed on Sep. 25, 2009.

(51) Int. Cl.
*G06F 12/00* (2006.01)
*G06T 1/60* (2006.01)

(52) U.S. Cl.
CPC .................................... *G06T 1/60* (2013.01)

(58) Field of Classification Search
CPC .............................. G06F 12/0207; G09G 5/39
See application file for complete search history.

(56) References Cited

U.S. PATENT DOCUMENTS

| 5,557,715 | A | * | 9/1996 | Ichiyanagi | .................... | 345/658 |
| 5,745,739 | A | * | 4/1998 | Wang et al. | .................. | 345/569 |
| 5,815,168 | A | * | 9/1998 | May | .............................. | 345/572 |
| 5,990,912 | A | * | 11/1999 | Swanson | ....................... | 345/568 |
| 6,052,126 | A | * | 4/2000 | Sakuraba et al. | ............. | 345/582 |
| 6,614,443 | B1 | * | 9/2003 | Peterson | ....................... | 345/569 |
| 6,810,500 | B1 | * | 10/2004 | Chang | ........................... | 714/763 |
| 6,930,688 | B1 | * | 8/2005 | Pether | ....................... | G06T 1/60 345/441 |
| 7,458,076 | B2 | * | 11/2008 | Swanberg et al. | ............ | 718/100 |

(Continued)

OTHER PUBLICATIONS

NVIDIA CUDA ("NVIDIA CUDA Compute Unified Device Architecture: Programming Guide", Version 1.1, Nov. 29, 2007).*

(Continued)

*Primary Examiner* — William Beutel
(74) *Attorney, Agent, or Firm* — Artegis Law Group, LLP

(57) ABSTRACT

One embodiment of the present invention sets forth a technique for a program to access multi-dimensional formatted graphics surface memory. Multi-dimensional memory objects called "surfaces" stored in a user-specified data or pixel format and arranged in a graphics optimized layout are accessed by programs using surface instructions. A set of memory access instructions e.g., load, store, reduce, and atomic, referred to as surface instructions, may be used to access the surfaces. Coordinate bounds checking is performed with configurable clamping. Caching behavior may also be specified by the surface instructions. Data format conversion and packing to a specified storage format is supported for store, reduction, and atomic surface instructions. Data format conversion and unpacking from a specified storage format is supported for loads and atomic surface instructions.

27 Claims, 8 Drawing Sheets

(56) References Cited

U.S. PATENT DOCUMENTS

| | | | |
|---|---|---|---|
| 7,515,159 B2* | 4/2009 | Kawano | 345/564 |
| 7,545,382 B1* | 6/2009 | Montrym et al. | 345/530 |
| 7,750,916 B2* | 7/2010 | Whitaker | 345/571 |
| 7,880,745 B2* | 2/2011 | Xu et al. | 345/582 |
| 7,932,912 B1* | 4/2011 | Van Dyke | 345/544 |
| 7,944,452 B1* | 5/2011 | Wietkemper et al. | 345/566 |
| 7,999,820 B1* | 8/2011 | Weitkemper et al. | 345/566 |
| 2006/0119602 A1* | 6/2006 | Fisher et al. | 345/441 |
| 2007/0124793 A1* | 5/2007 | Wang et al. | 725/134 |
| 2008/0055325 A1* | 3/2008 | Seigneret et al. | 345/538 |
| 2010/0030993 A1* | 2/2010 | Takizawa | G06F 12/0207 |
| | | | 711/167 |

OTHER PUBLICATIONS

Miguet et al. ("Reduction Operations on a Distributed Memory Machine with a Reconfigurable Interconnection Network", IEEE Transactions on Parallel and Distributed Systems, vol. 3, No. 4, Jul. 1992.).*

* cited by examiner

CONCEPTUAL DIAGRAM

ARCHITECTURE AND INSTRUCTIONS FOR ACCESSING MULTI-DIMENSIONAL FORMATTED SURFACE MEMORY

CROSS-REFERENCE TO RELATED APPLICATIONS

This application claims priority benefit to U.S. provisional patent application titled, "ARCHITECTURE AND INSTRUCTIONS FOR ACCESSING MULTI-DIMENSIONAL FORMATTED SURFACE MEMORY," filed on Sep. 25, 2009 and having Ser. No. 61/246,041.

BACKGROUND OF THE INVENTION

1. Field of the Invention

Embodiments of the invention generally relate to an architecture and instructions for accessing multi-dimensional formatted graphics surface memory.

2. Description of the Related Art

In a conventional graphics processing system graphics data is stored in memory space through the execution of vertex shader programs and pixel shader programs. The conventional graphics processing system is also configured to read data from and write data to multi-dimensional formatted graphics surface memory. In the multi-dimensional formatted graphics surface memory graphics data is stored using multi-dimensional tiling patterns that are based on the type and format of the graphics data being stored and that also allow for efficient access of two-dimensional surfaces, such as screen images, and three-dimensional surfaces, such as volume images. The graphics data stored in the multi-dimensional formatted graphics surface memory may also be compressed. The conversion of an x,y screen position or surface memory position into a physical address to access the graphics data requires knowledge of the memory configuration, graphics data type, graphics data format, and other attributes specific to the graphics data. Without this knowledge, an application program can only access the graphics data through the execution of a vertex or pixel shader program using the graphics processing system. Typically, at least some portions of this knowledge is embedded within the graphics processing system and is not available to an application program that is not executed by the graphics processing system.

Recently, compute application programs that are typically executed by a central processing unit (CPU) are converted to parallel compute application programs executed by a parallel graphics processing unit (GPU) using GPU computing features. However, parallel compute application programs are unable to access data stored in multi-dimensional formatted graphics surface memory since the GPU computing features are not configured to convert an x,y graphics surface memory coordinate into a computing memory byte address in order to access the graphics data, nor are the compute application programs configured to convert between graphics data formats and computing data formats.

Accordingly, what is needed in the art is an improved system and method that allows compute application programs to access multi-dimensional formatted graphics surface memory.

SUMMARY OF THE INVENTION

A system and method allows compute application programs to access multi-dimensional formatted graphics surface memory through new memory access instructions e.g., surface memory load, store, reduce, and atomic, referred to as surface instructions, may be used to access the surfaces.

Various embodiments of a method of the invention for accessing multi-dimensional formatted surface memory by a program include receiving a surface instruction that specifies coordinates of samples stored in a multi-dimensional formatted surface. An address of a location in the multi-dimensional formatted surface memory is computed based on the coordinates and attributes of the multi-dimensional formatted surface, where the attributes of the multi-dimensional formatted surface are controlled by a program. The samples stored in the multi-dimensional formatted surface are then accessed using the address.

Various embodiments of the invention include a system for executing a compute program that accesses multi-dimensional formatted surface memory. The system includes a parallel thread processor that is coupled to the multi-dimensional formatted surface memory. The parallel thread processor is configured to receive a surface instruction that specifies coordinates of samples stored in a multi-dimensional formatted surface and compute an address of a location in the multi-dimensional formatted surface memory based on the coordinates and attributes of the multi-dimensional formatted surface, where the attributes of the multi-dimensional formatted surface are controlled by a program. The parallel thread processor then accesses the samples stored in the multi-dimensional formatted surface using the address.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

In the following description, numerous specific details are set forth to provide a more thorough understanding of the present invention. However, it will be apparent to one of skill in the art that the present invention may be practiced without one or more of these specific details. In other instances, well-known features have not been described in order to avoid obscuring the present invention.

System Overview

Figure 1:
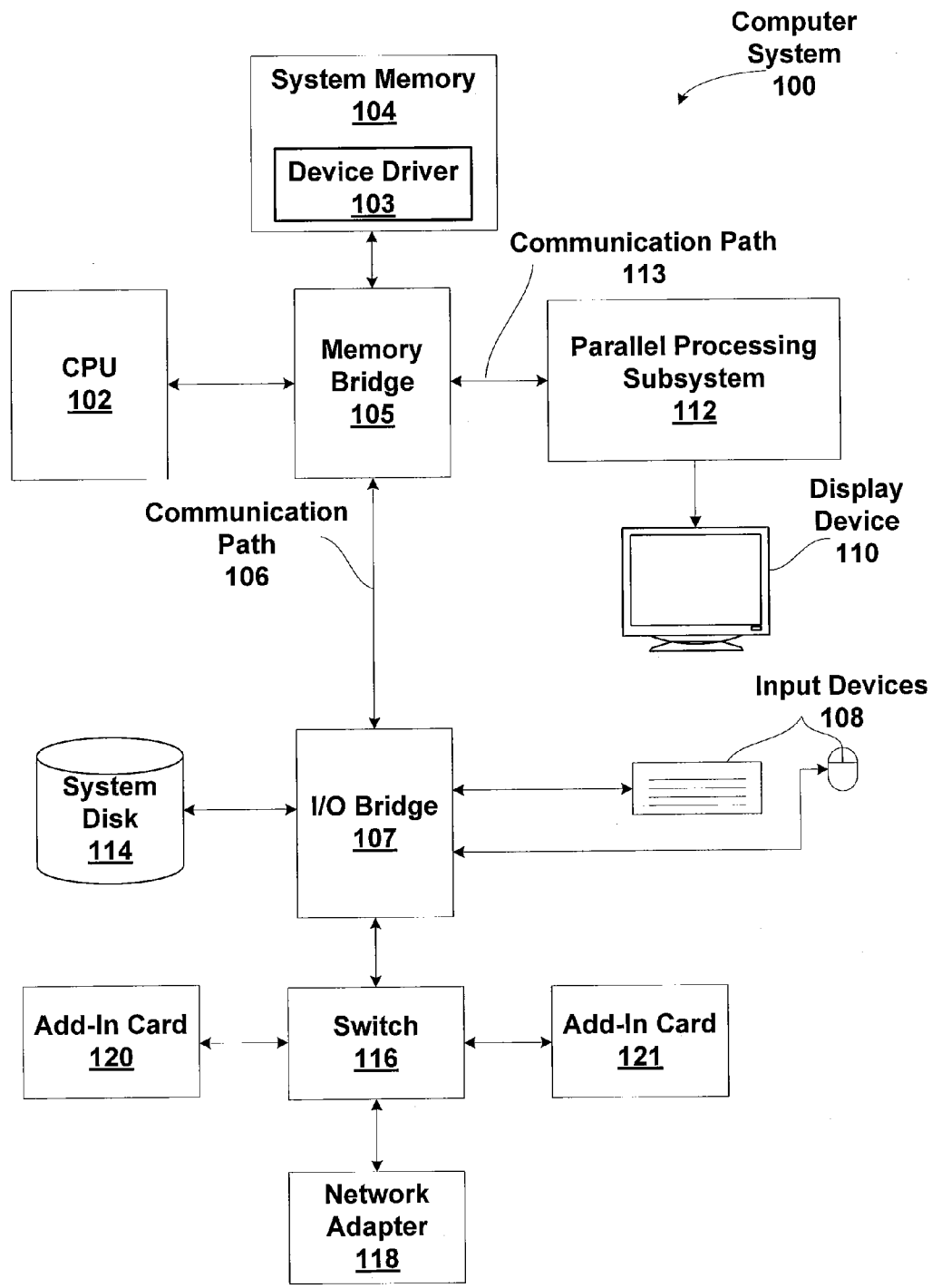
FIG. 1 is a block diagram illustrating a computer system configured to implement one or more aspects of the present invention.

FIG. 1 is a block diagram illustrating a computer system 100 configured to implement one or more aspects of the present invention. Computer system 100 includes a central processing unit (CPU) 102 and a system memory 104 communicating via an interconnection path that may include a memory bridge 105. Memory bridge 105, which may be, e.g., a Northbridge chip, is connected via a bus or other communication path 106 (e.g., a HyperTransport link) to an I/O (input/output) bridge 107. I/O bridge 107, which may be, e.g., a Southbridge chip, receives user input from one or more user input devices 108 (e.g., keyboard, mouse) and forwards the input to CPU 102 via path 106 and memory bridge 105. A parallel processing subsystem 112 is coupled to memory bridge 105 via a bus or other communication path 113 (e.g., a PCI Express, Accelerated Graphics Port, or HyperTransport link); in one embodiment parallel processing subsystem 112 is a graphics subsystem that delivers pixels to a display device 110 (e.g., a conventional CRT or LCD based monitor). A system disk 114 is also connected to I/O bridge 107. A switch 116 provides connections between I/O bridge 107 and other components such as a network adapter 118 and various add-in cards 120 and 121. Other components (not explicitly shown), including USB or other port connections, CD drives, DVD drives, film recording devices, and the like, may also be connected to I/O bridge 107. Communication paths interconnecting the various components in FIG. 1 may be implemented using any suitable protocols, such as PCI (Peripheral Component Interconnect), PCI-Express, AGP (Accelerated Graphics Port), HyperTransport, or any other bus or point-to-point communication protocol(s), and connections between different devices may use different protocols as is known in the art.

In one embodiment, the parallel processing subsystem 112 incorporates circuitry optimized for graphics and video processing, including, for example, video output circuitry, and constitutes a graphics processing unit (GPU). In another embodiment, the parallel processing subsystem 112 incorporates circuitry optimized for general purpose processing, while preserving the underlying computational architecture, described in greater detail herein. In yet another embodiment, the parallel processing subsystem 112 may be integrated with one or more other system elements, such as the memory bridge 105, CPU 102, and I/O bridge 107 to form a system on chip (SoC).

It will be appreciated that the system shown herein is illustrative and that variations and modifications are possible. The connection topology, including the number and arrangement of bridges, the number of CPUs 102, and the number of parallel processing subsystems 112, may be modified as desired. For instance, in some embodiments, system memory 104 is connected to CPU 102 directly rather than through a bridge, and other devices communicate with system memory 104 via memory bridge 105 and CPU 102. In other alternative topologies, parallel processing subsystem 112 is connected to I/O bridge 107 or directly to CPU 102, rather than to memory bridge 105. In still other embodiments, I/O bridge 107 and memory bridge 105 might be integrated into a single chip. Large embodiments may include two or more CPUs 102 and two or more parallel processing systems 112. The particular components shown herein are optional; for instance, any number of add-in cards or peripheral devices might be supported. In some embodiments, switch 116 is eliminated, and network adapter 118 and add-in cards 120, 121 connect directly to I/O bridge 107.

Figure 2:
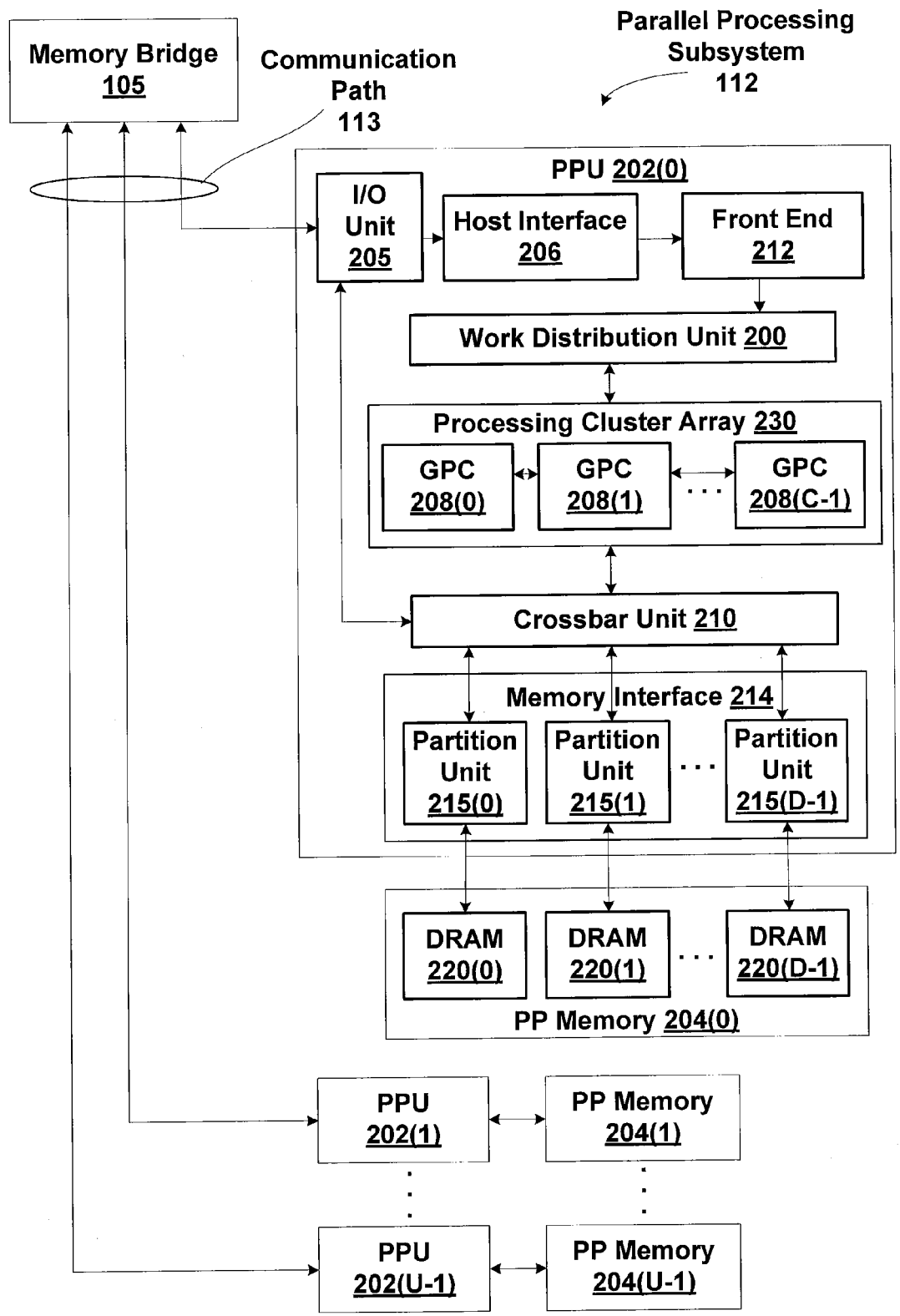
FIG. 2 is a block diagram of a parallel processing subsystem for the computer system of FIG. 1, according to one embodiment of the present invention.

FIG. 2 illustrates a parallel processing subsystem 112, according to one embodiment of the present invention. As shown, parallel processing subsystem 112 includes one or more parallel processing units (PPUs) 202, each of which is coupled to a local parallel processing (PP) memory 204. In general, a parallel processing subsystem includes a number U of PPUs, where U≥1. (Herein, multiple instances of like objects are denoted with reference numbers identifying the object and parenthetical numbers identifying the instance where needed.) PPUs 202 and parallel processing memories 204 may be implemented using one or more integrated circuit devices, such as programmable processors, application specific integrated circuits (ASICs), or memory devices, or in any other technically feasible fashion.

Referring again to FIG. 1, in some embodiments, some or all of PPUs 202 in parallel processing subsystem 112 are graphics processors with rendering pipelines that can be configured to perform various tasks related to generating pixel data from graphics data supplied by CPU 102 and/or system memory 104 via memory bridge 105 and bus 113, interacting with local parallel processing memory 204 (which can be used as graphics memory including, e.g., a conventional frame buffer) to store and update pixel data, delivering pixel data to display device 110, and the like. In some embodiments, parallel processing subsystem 112 may include one or more PPUs 202 that operate as graphics processors and one or more other PPUs 202 that are used for general-purpose computations. The PPUs may be identical or different, and each PPU may have its own dedicated parallel processing memory device(s) or no dedicated parallel processing memory device(s). One or more PPUs 202 may output data to display device 110 or each PPU 202 may output data to one or more display devices 110.

In operation, CPU 102 is the master processor of computer system 100, controlling and coordinating operations of other system components. In particular, CPU 102 issues commands that control the operation of PPUs 202. In some embodiments, CPU 102 writes a stream of commands for each PPU 202 to a pushbuffer (not explicitly shown in either FIG. 1 or FIG. 2) that may be located in system memory 104, parallel processing memory 204, or another storage location accessible to both CPU 102 and PPU 202. PPU 202 reads the command stream from the pushbuffer and then executes commands asynchronously relative to the operation of CPU 102.

Referring back now to FIG. 2, each PPU 202 includes an I/O (input/output) unit 205 that communicates with the rest of computer system 100 via communication path 113, which connects to memory bridge 105 (or, in one alternative embodiment, directly to CPU 102). The connection of PPU 202 to the rest of computer system 100 may also be varied. In some embodiments, parallel processing subsystem 112 is implemented as an add-in card that can be inserted into an expansion slot of computer system 100. In other embodiments, a PPU 202 can be integrated on a single chip with a bus bridge, such as memory bridge 105 or I/O bridge 107. In still other embodiments, some or all elements of PPU 202 may be integrated on a single chip with CPU 102.

In one embodiment, communication path 113 is a PCI-EXPRESS link, in which dedicated lanes are allocated to each PPU 202, as is known in the art. Other communication paths may also be used. An I/O unit 205 generates packets (or other signals) for transmission on communication path 113 and also receives all incoming packets (or other signals) from communication path 113, directing the incoming packets to appropriate components of PPU 202. For example, commands related to processing tasks may be directed to a host interface 206, while commands related to memory operations (e.g., reading from or writing to parallel processing memory 204) may be directed to a memory crossbar unit 210. Host interface 206 reads each pushbuffer and outputs the work specified by the pushbuffer to a front end 212.

Each PPU 202 advantageously implements a highly parallel processing architecture. As shown in detail, PPU 202(0) includes a processing cluster array 230 that includes a number C of general processing clusters (GPCs) 208, where $C \geq 1$. Each GPC 208 is capable of executing a large number (e.g., hundreds or thousands) of threads concurrently, where each thread is an instance of a program. In various applications, different GPCs 208 may be allocated for processing different types of programs or for performing different types of computations. For example, in a graphics application, a first set of GPCs 208 may be allocated to perform tessellation operations and to produce primitive topologies for patches, and a second set of GPCs 208 may be allocated to perform tessellation shading to evaluate patch parameters for the primitive topologies and to determine vertex positions and other per-vertex attributes. The allocation of GPCs 208 may vary dependent on the workload arising for each type of program or computation.

GPCs 208 receive processing tasks to be executed via a work distribution unit 200, which receives commands defining processing tasks from front end unit 212. Processing tasks include indices of data to be processed, e.g., surface (patch) data, primitive data, vertex data, and/or pixel data, as well as state parameters and commands defining how the data is to be processed (e.g., what program is to be executed). Work distribution unit 200 may be configured to fetch the indices corresponding to the tasks, or work distribution unit 200 may receive the indices from front end 212. Front end 212 ensures that GPCs 208 are configured to a valid state before the processing specified by the pushbuffers is initiated.

When PPU 202 is used for graphics processing, for example, the processing workload for each patch is divided into approximately equal sized tasks to enable distribution of the tessellation processing to multiple GPCs 208. A work distribution unit 200 may be configured to produce tasks at a frequency capable of providing tasks to multiple GPCs 208 for processing. By contrast, in conventional systems, processing is typically performed by a single processing engine, while the other processing engines remain idle, waiting for the single processing engine to complete its tasks before beginning their processing tasks. In some embodiments of the present invention, portions of GPCs 208 are configured to perform different types of processing. For example a first portion may be configured to perform vertex shading and topology generation, a second portion may be configured to perform tessellation and geometry shading, and a third portion may be configured to perform pixel shading in screen space to produce a rendered image. Intermediate data produced by GPCs 208 may be stored in buffers to allow the intermediate data to be transmitted between GPCs 208 for further processing.

Memory interface 214 includes a number D of partition units 215 that are each directly coupled to a portion of parallel processing memory 204, where $D \geq 1$. As shown, the number of partition units 215 generally equals the number of DRAM 220. In other embodiments, the number of partition units 215 may not equal the number of memory devices. Persons skilled in the art will appreciate that DRAM 220 may be replaced with other suitable storage devices and can be of generally conventional design. A detailed description is therefore omitted. Render targets, such as frame buffers or texture maps may be stored across DRAMs 220, allowing partition units 215 to write portions of each render target in parallel to efficiently use the available bandwidth of parallel processing memory 204.

Any one of GPCs 208 may process data to be written to any of the DRAMs 220 within parallel processing memory 204. Crossbar unit 210 is configured to route the output of each GPC 208 to the input of any partition unit 215 or to another GPC 208 for further processing. GPCs 208 communicate with memory interface 214 through crossbar unit 210 to read from or write to various external memory devices. In one embodiment, crossbar unit 210 has a connection to memory interface 214 to communicate with I/O unit 205, as well as a connection to local parallel processing memory 204, thereby enabling the processing cores within the different GPCs 208 to communicate with system memory 104 or other memory that is not local to PPU 202. In the embodiment shown in FIG. 2, crossbar unit 210 is directly connected with I/O unit 205. Crossbar unit 210 may use virtual channels to separate traffic streams between the GPCs 208 and partition units 215.

Again, GPCs 208 can be programmed to execute processing tasks relating to a wide variety of applications, including but not limited to, linear and nonlinear data transforms, filtering of video and/or audio data, modeling operations (e.g., applying laws of physics to determine position, velocity and other attributes of objects), image rendering operations (e.g., tessellation shader, vertex shader, geometry shader, and/or pixel shader programs), and so on. PPUs 202 may transfer data from system memory 104 and/or local parallel processing memories 204 into internal (on-chip) memory, process the data, and write result data back to system memory 104 and/or local parallel processing memories 204, where such data can be accessed by other system components, including CPU 102 or another parallel processing subsystem 112.

A PPU 202 may be provided with any amount of local parallel processing memory 204, including no local memory, and may use local memory and system memory in any combination. For instance, a PPU 202 can be a graphics processor in a unified memory architecture (UMA) embodiment. In such embodiments, little or no dedicated graphics (parallel processing) memory would be provided, and PPU 202 would use system memory exclusively or almost exclusively. In UMA embodiments, a PPU 202 may be integrated into a bridge chip or processor chip or provided as a discrete chip with a high-speed link (e.g., PCI-EXPRESS) connecting the PPU 202 to system memory via a bridge chip or other communication means.

As noted above, any number of PPUs 202 can be included in a parallel processing subsystem 112. For instance, multiple PPUs 202 can be provided on a single add-in card, or multiple add-in cards can be connected to communication path 113, or one or more of PPUs 202 can be integrated into a bridge chip. PPUs 202 in a multi-PPU system may be identical to or different from one another. For instance, different PPUs 202 might have different numbers of processing cores, different amounts of local parallel processing memory, and so on. Where multiple PPUs 202 are present, those PPUs may be operated in parallel to process data at a higher throughput than is possible with a single PPU 202. Systems incorporating one or more PPUs 202 may be implemented in a variety of configurations and form factors, including desktop, laptop, or handheld personal computers, servers, workstations, game consoles, embedded systems, and the like.

Processing Cluster Array Overview

Figure 3A:
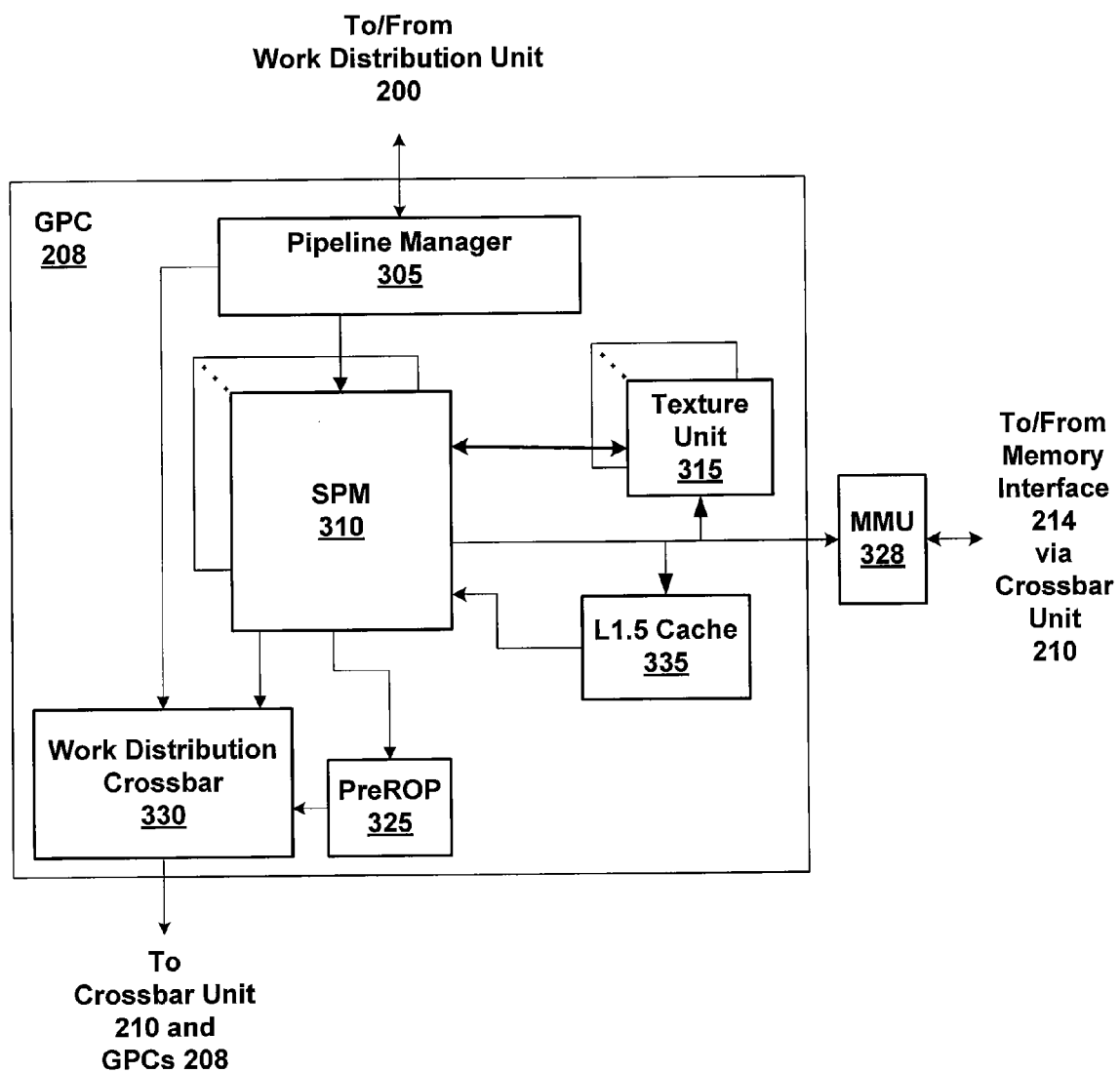
FIG. 3A is a block diagram of a GPC within one of the PPUs of FIG. 2, according to one embodiment of the present invention.

FIG. 3A is a block diagram of a GPC 208 within one of the PPUs 202 of FIG. 2, according to one embodiment of the present invention. Each GPC 208 may be configured to execute a large number of threads in parallel, where the term "thread" refers to an instance of a particular program executing on a particular set of input data. In some embodiments, single-instruction, multiple-data (SIMD) instruction issue techniques are used to support parallel execution of a large number of threads without providing multiple independent instruction units. In other embodiments, single-instruction, multiple-thread (SIMT) techniques are used to support parallel execution of a large number of generally synchronized threads, using a common instruction unit configured to issue instructions to a set of processing engines within each one of the GPCs 208. Unlike a SIMD execution regime, where all processing engines typically execute identical instructions, SIMT execution allows different threads to more readily follow divergent execution paths through a given thread program. Persons skilled in the art will understand that a SIMD processing regime represents a functional subset of a SIMT processing regime.

Operation of GPC 208 is advantageously controlled via a pipeline manager 305 that distributes processing tasks to parallel thread processors called streaming multiprocessors (SPMs) 310. Pipeline manager 305 may also be configured to control a work distribution crossbar 330 by specifying destinations for processed data output by SPMs 310.

In one embodiment, each GPC 208 includes a number M of SPMs 310, where M≥1, each SPM 310 configured to process one or more thread groups. Also, each SPM 310 advantageously includes an identical set of functional execution units (e.g., arithmetic logic units, and load-store units, shown as Exec units 302 and LSUs 303 in FIG. 4) that may be pipelined, allowing a new instruction to be issued before a previous instruction has finished, as is known in the art. Any combination of functional execution units may be provided. In one embodiment, the functional units support a variety of operations including integer and floating point arithmetic (e.g., addition and multiplication), comparison operations, Boolean operations (AND, OR, XOR), bit-shifting, and computation of various algebraic functions (e.g., planar interpolation, trigonometric, exponential, and logarithmic functions, etc.); and the same functional-unit hardware can be leveraged to perform different operations.

The series of instructions transmitted to a particular GPC 208 constitutes a thread, as previously defined herein, and the collection of a certain number of concurrently executing threads across the parallel processing engines (not shown) within an SPM 310 is referred to herein as a "warp" or "thread group." As used herein, a "thread group" refers to a group of threads concurrently executing the same program on different input data, with one thread of the group being assigned to a different processing engine within an SPM 310. A thread group may include fewer threads than the number of processing engines within the SPM 310, in which case some processing engines will be idle during cycles when that thread group is being processed. A thread group may also include more threads than the number of processing engines within the SPM 310, in which case processing will take place over consecutive clock cycles. Since each SPM 310 can support up to G thread groups concurrently, it follows that up to G*M thread groups can be executing in GPC 208 at any given time.

Additionally, a plurality of related thread groups may be active (in different phases of execution) at the same time within an SPM 310. This collection of thread groups is referred to herein as a "cooperative thread array" ("CTA") or "thread array." The size of a particular CTA is equal to m*k, where k is the number of concurrently executing threads in a thread group and is typically an integer multiple of the number of parallel processing engines within the SPM 310, and m is the number of thread groups simultaneously active within the SPM 310. The size of a CTA is generally determined by the programmer and the amount of hardware resources, such as memory or registers, available to the CTA.

Each SPM 310 contains an L1 cache (not shown) or uses space in a corresponding L1 cache outside of the SPM 310 that is used to perform load and store operations. Each SPM 310 also has access to L2 caches within the partition units 215 that are shared among all GPCs 208 and may be used to transfer data between threads. Finally, SPMs 310 also have access to off-chip "global" memory, which can include, e.g., parallel processing memory 204 and/or system memory 104. It is to be understood that any memory external to PPU 202 may be used as global memory. Additionally, an L1.5 cache 335 may be included within the GPC 208, configured to receive and hold data fetched from memory via memory interface 214 requested by SPM 310, including instructions, uniform data, and constant data, and provide the requested data to SPM 310. Embodiments having multiple SPMs 310 in GPC 208 beneficially share common instructions and data cached in L1.5 cache 335.

Each GPC 208 may include a memory management unit (MMU) 328 that is configured to map virtual addresses into physical addresses. In other embodiments, MMU(s) 328 may reside within the memory interface 214. The MMU 328 includes a set of page table entries (PTEs) used to map a virtual address to a physical address of a tile and optionally a cache line index. The MMU 328 may include address translation lookaside buffers (TLB) or caches which may reside within multiprocessor SPM 310 or the L1 cache or GPC 208. The physical address is processed to distribute surface data access locality to allow efficient request interleaving among partition units. The cache line index may be used to determine whether of not a request for a cache line is a hit or miss.

In graphics and computing applications, a GPC 208 may be configured such that each SPM 310 is coupled to a texture unit 315 for performing texture mapping operations, e.g., determining texture sample positions, reading texture data, and filtering the texture data. Texture data is read from an internal texture L1 cache (not shown) or in some embodiments from the L1 cache within SPM 310 and is fetched from an L2 cache, parallel processing memory 204, or system memory 104, as needed. Each SPM 310 outputs processed tasks to work distribution crossbar 330 in order to provide the processed task to another GPC 208 for further processing or to store the processed task in an L2 cache, parallel processing memory 204, or system memory 104 via crossbar unit 210. A preROP (pre-raster operations) 325 is configured to receive data from SPM 310, direct data to ROP units within partition units 215, and perform optimizations for color blending, organize pixel color data, and perform address translations.

It will be appreciated that the core architecture described herein is illustrative and that variations and modifications are possible. Any number of processing units, e.g., SPMs 310 or texture units 315, preROPs 325 may be included within a GPC 208. Further, while only one GPC 208 is shown, a PPU 202 may include any number of GPCs 208 that are advantageously functionally similar to one another so that execution behavior does not depend on which GPC 208 receives a particular processing task. Further, each GPC 208 advantageously operates independently of other GPCs 208 using separate and distinct processing units, L1 caches, and so on.

Figure 3B:
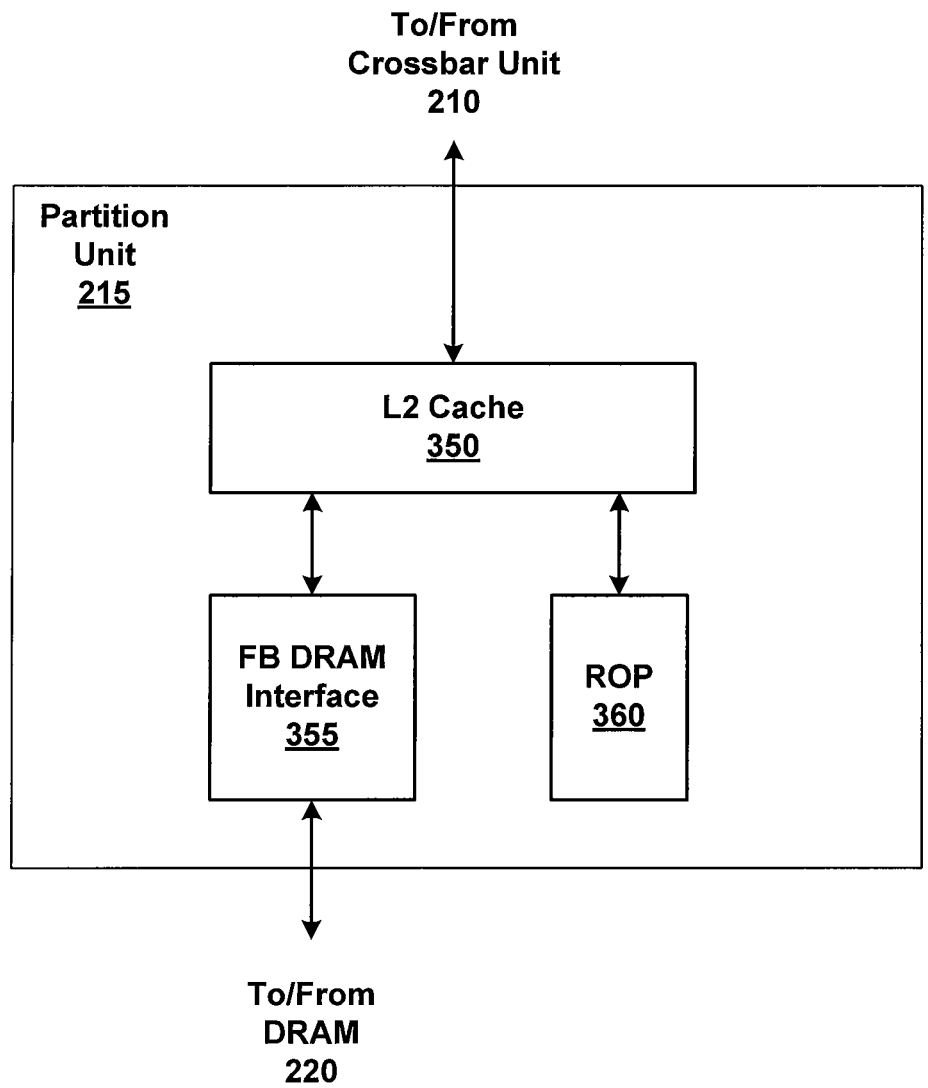
FIG. 3B is a block diagram of a partition unit within one of the PPUs of FIG. 2, according to one embodiment of the present invention.

FIG. 3B is a block diagram of a partition unit 215 within one of the PPUs 202 of FIG. 2, according to one embodiment of the present invention. As shown, partition unit 215 includes a L2 cache 350, a frame buffer (FB) DRAM interface 355, and a raster operations unit (ROP) 360. L2 cache 350 is a read/write cache that is configured to perform load and store operations received from crossbar unit 210 and ROP 360. Read misses and urgent writeback requests are output by L2 cache 350 to FB DRAM interface 355 for processing. Dirty updates are also sent to FB 355 for opportunistic processing. FB 355 interfaces directly with DRAM 220, outputting read and write requests and receiving data read from DRAM 220.

In graphics applications, ROP 360 is a processing unit that performs raster operations, such as stencil, z test, blending, and the like, and outputs pixel data as processed graphics data for storage in graphics memory. In some embodiments of the present invention, ROP 360 is included within each GPC 208 instead of partition unit 215, and pixel read and write requests are transmitted over crossbar unit 210 instead of pixel fragment data.

The processed graphics data may be displayed on display device 110 or routed for further processing by CPU 102 or by one of the processing entities within parallel processing subsystem 112. Each partition unit 215 includes a ROP 360 in order to distribute processing of the raster operations. In some embodiments, ROP 360 may be configured to compress z or color data that is written to memory and decompress z or color data that is read from memory.

Persons skilled in the art will understand that the architecture described in FIGS. 1, 2, 3A, and 3B in no way limits the scope of the present invention and that the techniques taught herein may be implemented on any properly configured processing unit, including, without limitation, one or more CPUs, one or more multi-core CPUs, one or more PPUs 202, one or more GPCs 208, one or more graphics or special purpose processing units, or the like, without departing the scope of the present invention.

In embodiments of the present invention, it is desirable to use PPU 122 or other processor(s) of a computing system to execute general-purpose computations using thread arrays. Each thread in the thread array is assigned a unique thread identifier ("thread ID") that is accessible to the thread during its execution. The thread ID, which can be defined as a one-dimensional or multi-dimensional numerical value controls various aspects of the thread's processing behavior. For instance, a thread ID may be used to determine which portion of the input data set a thread is to process and/or to determine which portion of an output data set a thread is to produce or write.

A sequence of per-thread instructions may include at least one instruction that defines a cooperative behavior between the representative thread and one or more other threads of the thread array. For example, the sequence of per-thread instructions might include an instruction to suspend execution of operations for the representative thread at a particular point in the sequence until such time as one or more of the other threads reach that particular point, an instruction for the representative thread to store data in a shared memory to which one or more of the other threads have access, an instruction for the representative thread to atomically read and update data stored in a shared memory to which one or more of the other threads have access based on their thread IDs, or the like. The CTA program can also include an instruction to compute an address in the shared memory from which data is to be read, with the address being a function of thread ID. By defining suitable functions and providing synchronization techniques, data can be written to a given location in shared memory by one thread of a CTA and read from that location by a different thread of the same CTA in a predictable manner. Consequently, any desired pattern of data sharing among threads can be supported, and any thread in a CTA can share data with any other thread in the same CTA. The extent, if any, of data sharing among threads of a CTA is determined by the CTA program; thus, it is to be understood that in a particular application that uses CTAs, the threads of a CTA might or might not actually share data with each other, depending on the CTA program, and the terms "CTA" and "thread array" are used synonymously herein.

Figure 4:
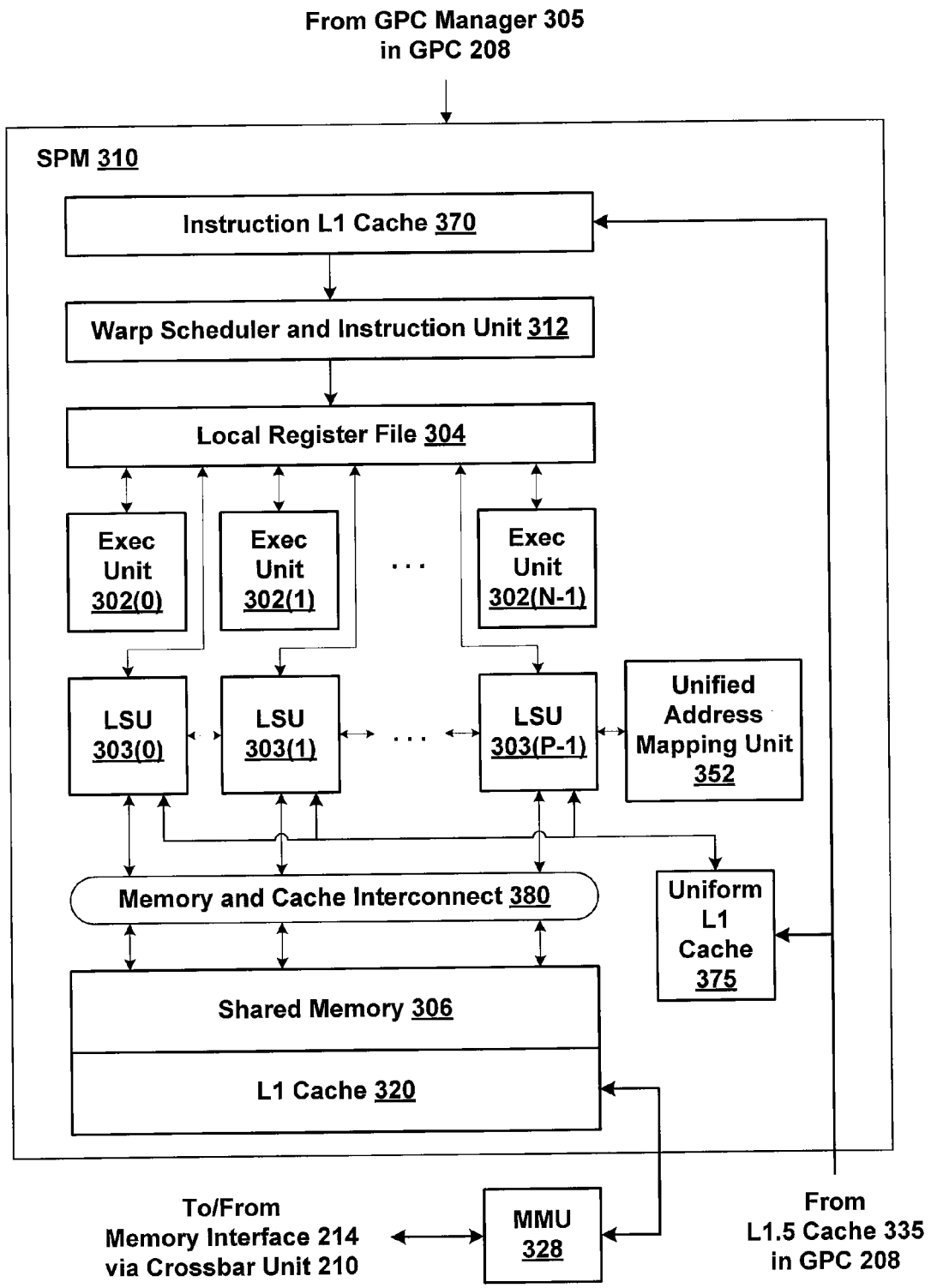
FIG. 4 is a block diagram of a portion of the SPM of FIG. 3A, according to one embodiment of the present invention.

FIG. 4 is a block diagram of the SPM 310 of FIG. 3A, according to one embodiment of the present invention. The SPM 310 includes an instruction L1 cache 370 that is configured to receive instructions and constants from memory via L1.5 cache 335. A warp scheduler and instruction unit 312 receives instructions and constants from the instruction L1 cache 370 and controls local register file 304 and SPM 310 functional units according to the instructions and constants. The SPM 310 functional units include N exec (execution or processing) units 302 and P load-store units (LSU) 303.

SPM 310 provides on-chip (internal) data storage with different levels of accessibility. Special registers (not shown) are readable but not writeable by LSU 303 and are used to store parameters defining each CTA thread's "position." In one embodiment, special registers include one register per CTA thread (or per exec unit 302 within SPM 310) that stores a thread ID; each thread ID register is accessible only by a respective one of the exec unit 302. Special registers may also include additional registers, readable by all CTA threads (or by all LSUs 303) that store a CTA identifier, the CTA dimensions, the dimensions of a grid to which the CTA belongs, and an identifier of a grid to which the CTA belongs. Special registers are written during initialization in response to commands received via front end 212 from device driver 103 and do not change during CTA execution.

A parameter memory (not shown) stores runtime parameters (constants) that can be read but not written by any CTA thread (or any LSU 303). In one embodiment, device driver 103 provides parameters to the parameter memory before directing SPM 310 to begin execution of a CTA that uses these parameters. Any CTA thread within any CTA (or any exec unit 302 within SPM 310) can access global memory through a memory interface 214. Portions of global memory may be stored in the L1 cache 320.

Local register file 304 is used by each CTA thread as scratch space; each register is allocated for the exclusive use of one thread, and data in any of local register file 304 is accessible only to the CTA thread to which it is allocated. Local register file 304 can be implemented as a register file that is physically or logically divided into P lanes, each having some number of entries (where each entry might store, e.g., a 32-bit word). One lane is assigned to each of the N exec units 302 and P load-store units LSU 303, and corresponding entries in different lanes can be populated with data for different threads executing the same program to facilitate SIMD execution. Different portions of the lanes can be allocated to different ones of the G concurrent thread groups, so that a given entry in the local register file 304 is accessible only to a particular thread. In one embodiment, certain entries within the local register file 304 are reserved for storing thread identifiers, implementing one of the special registers.

Shared memory 306 is accessible to all CTA threads (within a single CTA); any location in shared memory 306 is accessible to any CTA thread within the same CTA (or to any processing engine within SPM 310). Shared memory 306 can be implemented as a shared register file or shared on-chip cache memory with an interconnect that allows any processing engine to read from or write to any location in the shared memory. In other embodiments, shared state space might map onto a per-CTA region of off-chip memory, and be cached in L1 cache 320. The parameter memory can be implemented as a designated section within the same shared register file or shared cache memory that implements shared memory 306, or as a separate shared register file or on-chip cache memory to which the LSUs 303 have read-only access. In one embodiment, the area that implements the parameter memory is also used to store the CTA ID and grid ID, as well as CTA and grid dimensions, implementing portions of the special registers. Each LSU 303 in SPM 310 is coupled to a unified address mapping unit 352 that converts an address provided for load and store instructions that are specified in a unified memory space into an address in each distinct memory space. Consequently, an instruction may be used to access any of the local, shared, or global memory spaces by specifying an address in the unified memory space.

The L1 Cache 320 in each SPM 310 can be used to cache private per-thread local data and also per-application global data. In some embodiments, the per-CTA shared data may be cached in the L1 cache 320. The LSUs 303 are coupled to a uniform L1 cache 371, the shared memory 306, and the L1 cache 320 via a memory and cache interconnect 380. The uniform L1 cache 371 is configured to receive read-only data and constants from memory via the L1.5 Cache 335.

Multi-Dimensional Formatted Surface Memory

Graphics processing systems, such as the PPUs 202 are configured to read from and write to surfaces that are multi-dimensional arrays of formatted data stored in graphics memory. An example surface is a two-dimensional (2D) image where each pixel or sample has a data format, such as red, green, blue, and alpha (RGBA) components, and each component is stored as a normalized 8-bit value from 0 to 255, representing floating point component values 0.0 to 1.0. Other surface formats include RGBA with 16-bit "half" floating-point components, 16-bit integer components, 32-bit floating-point components, and formats with 1, 2, 3, and 4 components. Some video surface formats include Y, UV, YUV, and RGB with 8-bit, 10-bit, and 11-bit integer components. Other examples include one-, two-, and three-dimensional textures with various texture component formats, three-dimensional (3D) volumes, one-dimensional (1D) data vectors, 2D RGBA, and Z render targets.

For interoperability with graphics applications and data formats, high performance access to 2D surfaces, arrays of 2D surfaces, and 3D surfaces can be stored as tiled or blocked memory surfaces. Internally, multi-dimensional tiled surface organizations implemented with 2D and 3D blocks are referred to as "blocklinear," and conventional raster-scan organizations "pitch" or "bytelinear."

To efficiently support video and image processing applications, compute programs and graphics pixel shaders can directly access readable/writeable surfaces stored in memory using new instructions, specifically, surface-load, surface-store, surface-reduce, and surface-atomic instructions. These new surface access instructions are executed by the LSUs 303 within each SPM 310, and by the partition units 215.

The multi-dimensional arrays of formatted data stored in graphics memory are used to perform many surface related functions, including read/write access to surfaces that interoperate with graphics and video programs, selectable clamp-to-edge coordinate addressing behavior, selectable out-of-bounds coordinate addressing behavior, coordinate byte addressing for raw surface accesses, coordinate pixel/sample addressing for multi- or super-sampled surfaces, direct load/store of raw surface data in memory, format conversion of pixel/sample data to/from program type, dynamic run-time binding of surfaces of many types to a program, and data conversion between surface memory formats and register formats. Surfaces may be 1D, 2D, and 3D, arrays of 1D surfaces with 1D caching, arrays of 2D and 3D surfaces with 2D block caching, arrays of 3D surfaces with 3D block caching. Coordinate addressing may be used for 1D, 2D, and 3D and arrays of 1D, 2D and 3D surfaces.

Various properties of a surface influence how the surface is stored. The properties include the size (in samples) in each dimension, a component mask describing which components exist in a surface, the size of each sample (in bytes), the format of a pixel, the surface layout (pitch or block linear) and pitch dimensions or block size, the rank (1D, array of 1D, 2D, array of 2D, or 3D), base address, and surface identifier (ID number), handle, or pointer to the surface descriptor.

A surface has a size in each dimension in samples. A surface in block linear memory format is tiled with blocks. Blocks are composed of gobs. In one embodiment, a gob is 8 rows by 64 bytes. Within a gob, the low address bits from each dimension are interleaved. Sequential gobs are allocated to sequential memory addresses. The device driver 103 sets the size of a block to be some number of gobs (power-of-two values) in each direction. The block size is part of the surface description, and is used to determine the actual address of the sample in memory. Given the block size, the number of blocks in each dimension can be computed by dividing the sample dimensions by the block size in each dimension.

Figure 5A:
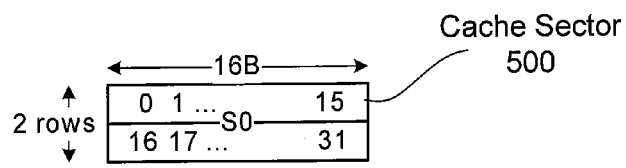
FIG. 5A is a conceptual diagram of a sector within a multi-dimensional tiled graphics surface, according to one embodiment of the present invention.

FIG. 5A is a conceptual diagram of a cache sector 500 within a multi-dimensional block linear formatted graphics surface, according to one embodiment of the present invention. In this embodiment, the dimensions of the cache sector 500, as viewed by the compute program, are 16 bytes by 2 rows, with bytes 0-15 stored in a first row and bytes 16-31 stored in a second row. Each cache sector 500 corresponds to 32 contiguous bytes of physical memory.

Figure 5B:
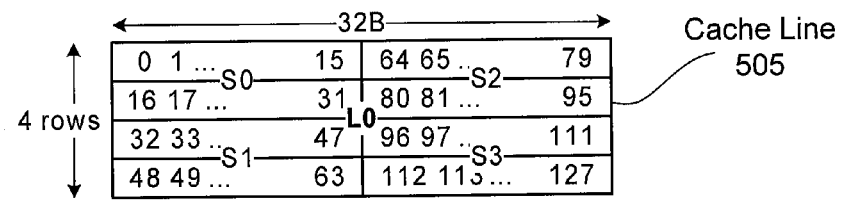
FIG. 5B is a conceptual diagram of a cache line within a multi-dimensional tiled graphics surface, according to one embodiment of the present invention.

FIG. 5B is a conceptual diagram of a cache line 505 within a multi-dimensional block linear formatted graphics surface, according to one embodiment of the present invention. In this embodiment, the dimensions of the cache line 505, as viewed by the compute program, are 32 bytes by 4 rows and includes four interleaved cache sectors 500 (S0, S1, S2, and S3) for a total size of 128 bytes.

Figure 5C:
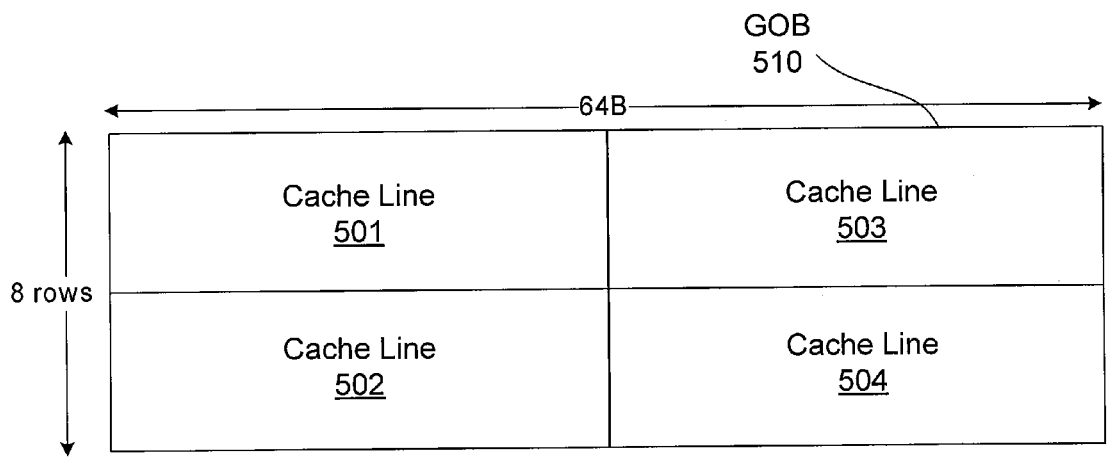
FIG. 5C is a conceptual diagram of a GOB within a multi-dimensional tiled graphics surface, according to one embodiment of the present invention.

FIG. 5C is a conceptual diagram of a GOB 510 within a multi-dimensional block linear formatted graphics surface, according to one embodiment of the present invention. In this embodiment, the dimensions of the GOB 510, as viewed by the compute program, are 64 bytes by 8 rows and includes four cache lines 505 (cache line 501, cache line 502, cache line 503, and cache line 504 for a total size of 512 bytes. Each cache line includes four interleaved cache sectors 500. The cache lines may be interleaved in the same manner as the cache sectors 500 or in a different manner. A block is a group of GOBs 510 that may also be interleaved in the same manner as the cache sectors 500 or in a different manner. In contrast, conventional memory that is accessed by the CPU 102 is addressed linearly and does not allow for configurable behavior for accesses that are outside of the address bounds.

Several steps are performed to create a byte address from (x,y,z) coordinates on a particular surface type. For 1D surfaces, y=0 and z=0 is assumed and for 2D surfaces, z=0 is assumed. For arrays of surfaces, the array index is used to compute a generic address offset for the start of the selected 1D (if array of 1D) or 2D (if array of 2D) surface. The offset of the GOB corresponding to the x, y, and z coordinates is computed. The surface address computation should match the computation that is performed by the texture unit 315 to ensure that surfaces created by surface instructions can be read by the texture unit 315, and that surfaces produced by graphics shader programs can be consumed by surface instructions (instructions used by a compute program that access a graphics surface). For an array of surfaces, the array index is multiplied by the surface size and summed with the offset.

The byte order inside a GOB may be swizzled in a pattern, such as the pattern shown in FIGS. 5A, 5B, and 5C. The L1 cache 320 (which surface instructions use) produces a virtual address.

To compute a virtual address for a block linear byte addressed surface, the surface base is summed with the product of the GOB address and the bytes per GOB, the offset in the GOB, and the array offset. To compute a virtual address for a pitch memory layout, the surface base is summed with the x coordinate and the product of the x offset and (the number of bytes in an access/8) and the y coordinate and the product of the y offset and the width of the image in bytes. There are no blocks or GOBs in pitch memory format.

Figure 5D:
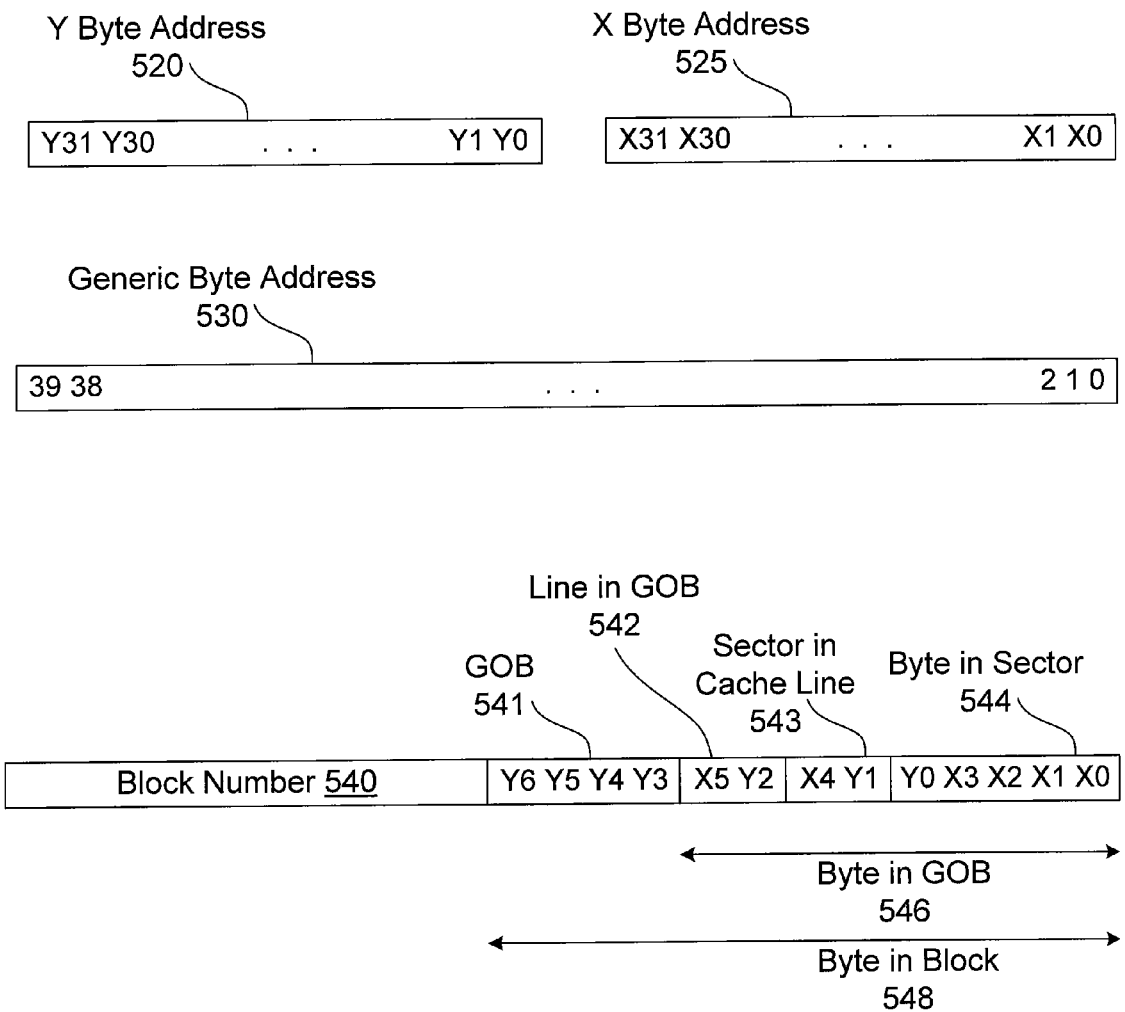
FIG. 5D is a diagram of the different address formats used to access a multi-dimensional tiled graphics surface, according to one embodiment of the present invention.

FIG. 5D is a diagram of the generic byte address format 530 that is used to access a multi-dimensional formatted graphics surface, according to one embodiment of the present invention. A compute surface instruction specifies sample coordinates (x, y, and optional z) that are converted into a y byte address 520 and an x byte address 525. A generic byte address 530 for a block that is 16 GOBs high and 1 GOB wide includes the sample coordinates in several fields. The x and y coordinate bits are used to compute a block number 540 as [Y31:Y7]*SurfaceBlockWidth+[X31:X6]. The specific GOB within the block is identified by GOB 541. The line in the GOB 542 is identified by one x coordinate bit and one y coordinate bit. The sector in the cache line 543 is also identified by one x coordinate bit and one y coordinate bit. The byte in the sector 544 is identified by both x and y coordinate bits. The byte in sector 544, sector in cache line 543 and line in the GOB may be combined to produce the byte in the GOB 546. The byte in the GOB 546 may be used with the GOB 541 to identify the byte in the block 548.

Different swizzling patterns of different multi-dimensional formatted surfaces may use different combinations of the x and y coordinates to address the samples stored in the surface. Without specific knowledge of the surface format, a compute program is unable to access the samples stored in the surface. New surface instructions are defined that allow a compute program to access multi-dimensional formatted surfaces that could previously only be accessed by graphics shaders. These new surface instructions may be used to distribute the processing workload between graphics shaders and compute programs. For example, a multi-dimensional formatted surface may be rendered by a graphics shader and then image processing may be performed by a compute program. Another graphics shader may then process the samples resulting from the image processing to produce another multi-dimensional formatted surface.

Instructions to Access Multi-Dimensional Formatted Surfaces

The multi-dimensional formatted surfaces may be accessed as textures, render targets, and arrays, consisting of a 1D, array of 1D, 2D, array of 2D, or 3D array of samples or texels with 1, 2, or 4 components of RGBA or Z+stencil, and a surface pixel data format. In one embodiment, class methods set the properties of each surface. As previously explained, surfaces may be addressed directly using byte addresses, or for more flexibility, with sample coordinates. The surface instructions take a surface identifier operand as a register or immediate. Surface load/store instruction operands specify a data destination/source register vector, the format of the registers, the surface identifier register or immediate, an x, y, z coordinate register vector, and small, signed offsets for each dimension.

Embodiments of the invention provide a set of surface memory access instructions e.g., surface load, store, reduce, and atomic, referred to as surface instructions, for accessing multi-dimensional arrays of formatted "surfaces" in memory. The surfaces have the several properties and are multi-dimensional arrays of formatted data designed to be accessed by parallel threads. Coordinate bounds checking is performed with configurable clamping. Caching operations may also be specified by the surface instructions, e.g., cache in L1 cache 320 versus cache in L2 cache 350. Data format conversion and packing to a specified storage format is supported for store, reduction, and atomic surface instructions. Data format conversion and unpacking from a specified storage format is supported for load and atomic surface instructions.

The new instructions for surface access include SULD—load data from surface, SUST—store data to surface, SURED—perform atomic reduction on data in surface, SUATOM—perform atomic operation on data in surface, SUQ—query surface attributes, and SULEA—make a generic unified effective address from a surface coordinate address, suitable for use with generic unified LD, ST, RED, and ATOM. The SUQ surface instruction queries a specified surface property and returns the requested surface attributes.

The surface load (SULD), surface store (SUST), surface reduction (SURED), and surface atomic (SUATOM)

instructions provide load, store, reduce, and atomic operations on surface data in memory, where a surface is a multidimensional object containing multi-component values, called samples or pixels. There are two versions of these surface instructions. The low-level instructions provide raw access to 1D and 2D block-linear or pitch surface data, using byte addresses to access raw surface data with knowledge of the data format and size. The higher-level instructions provide sample addressing, address clamping, and data format conversion between the memory representation of data and the representation in processor registers.

The addresses specified by these instructions are multidimensional, and are specified in a vector of registers (1 register for 1D, 2 registers for 2D, etc.). The sample data has multiple components, and therefore also resides in a vector of registers whose length is determined by the number of components in the component mask (or the memory format). The size of the data register is specified in the instruction, as is the type of the data. For 64-bit data, the components span 2 registers.

A program uses commands to specify the attributes of each surface, including the component data format, the base address of the surface, the size of the surface (in samples), and the size of the blocks in the surface. The application program selects surface formats and register formats, and the device driver 103 creates a surface that agrees with the instructions that calculate surface data register operands and results (several choices are typically possible). For example, if the program computes with 32-bit floats, the surface format can be any one of the surfaces that can be converted to/from a register format of F32. Each surface also has a unique surface identifier, e.g. a number 0 to 7, and the device driver 103 sets properties of surfaces via commands (class methods).

Samples in surfaces may be addressed with 1, 2, or 3 signed integer coordinates from registers, augmented by small immediate values. The sample address is computed, optionally clamped to the nearest surface edge, and then converted to a memory location. Sample addressing is useful in that the application may be used with a variety of memory formats that have different storage requirements, and no extra code is required to handle the formats of different sizes. When sample addressing is used, the format of the register should be specified. The representation of the data in memory is controlled by the surface type, and is set by the device driver 103.

Clamping of surface coordinates may be configured for the SULD, SUST, SURED, SUATOM, and SULEA compute surface instructions. A coordinate is out of bounds when it is negative or greater-than-or-equal-to the maximum width or height or depth of the surface. The surface load (SULD) and surface atomic (SUATOM) compute surface instructions allow out-of-bounds reads to return 0, the nearest edge sample, or error on out-of-bounds. The surface store (SUST), the surface reduction (SURED), and the surface atomic (SUATOM) instructions allow out-of-bounds writes to be ignored, clamped to the nearest edge sample, or error with an illegal address. This behavior is specified by the instruction.

In some cases a compute program may address the surface directly as bytes. This is supported with the byte addressing specifier in the SULD, SUST, SULEA, SURED, and SUATOM surface instructions. When accessing a surface directly, the format of the surface and the size of the sample are ignored, using the size specification in the instruction to load or store from 1 to N bytes in the surface, where N may be 16. The memory transfer size is specified using S8, U8, S16, U16, U32, U64 and U128. The sizes less than 32 bits are sign or zero-extended to fill a 32-bit register with the S (signed) and U (unsigned) designators. Sizes larger than the register (32 bits) fill sequential registers. The data registers must be aligned for the size of the transfer (64-bit requires an even register; 128-bit transfers require a mod-4 register). Other register sizes may be used in other embodiments.

One reason to provide byte addressing is to provide improved bandwidth by accessing multiple samples. For example, if the surface format is known to contain 32-bit samples with 8 bits for each component, direct access load instructions can be used to load 4 samples in one instruction. The register format would be specified as U128 pulling in 16 bytes of data (4 samples) in one load instruction. This is beneficial for any 32-bit sample format. The address in the byte addressing mode is a byte address, but still has multiple coordinates. Addressing and bit interpretation when using direct addressing is managed by the compute program. Clamp-to-edge in direct-access-mode is supported. When byte addressing is used negative values are zeroed, while too-large values of x are set to the maximum x-coordinate of a sample (in bytes), using the bytes-per-sample value stored in the surface descriptor. The y-coordinate behavior remains the same as the sample based coordinate addressing (i.e., row numbers are independent of byte-based or sample-based addressing). The behavior of z-coordinate or array coordinate addressing is also independent of byte-based or sample-based addressing.

The representation of surface values in memory may be different than what is held in registers. In registers, the values are always 32-bits, S32, U32 or F32. The device driver 103 specifies the format of the surface. The memory formats may be chosen from combinations of component size, component type, and number of components. For example, component size may include 1, 2, 8, 10, 11, 16, or 32 bits per component, component type may include floating-point, signed integer, unsigned integer, signed normalized values, or unsigned normalized values, and number of components may include 1, 2, 3, or 4 components per sample. The surface instructions specify the register format that the data have when loaded into or stored from a register. Each component is converted from its memory format to the specified register format in a SULD or SUATOM surface instruction, and the opposite conversion is performed by the SUST, SUATOM, or SURED surface instruction.

Figure 6:
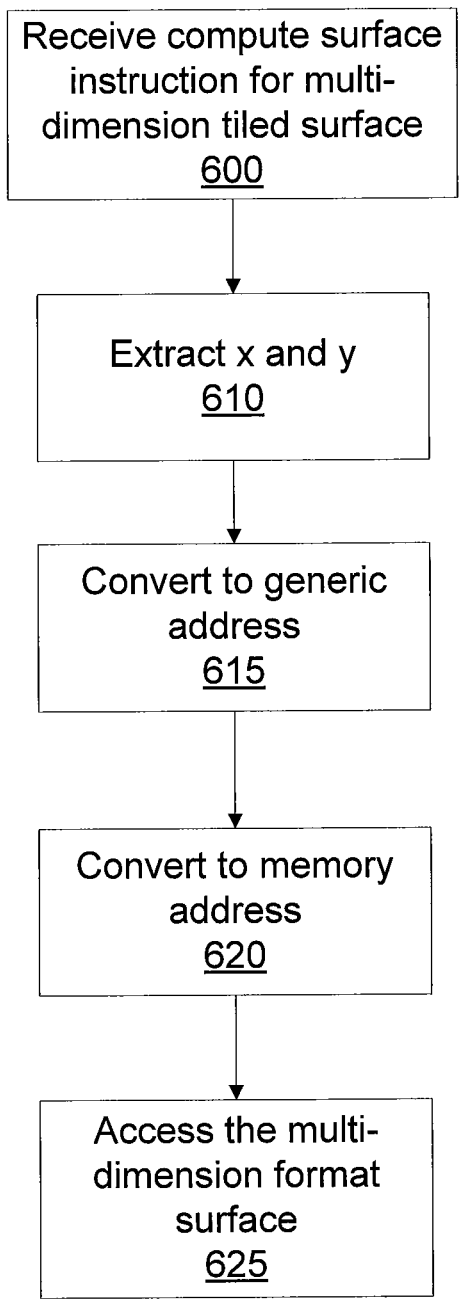
FIG. 6 is a flow diagram of method steps for a compute application program to use a compute surface instruction to access a multi-dimensional tiled graphics surface, according to one embodiment of the present invention.

FIG. 6 is a flow diagram of method steps for a compute application program to use a surface instruction to access a multi-dimensional formatted graphics surface, according to one embodiment of the present invention. At step 600, a surface instruction is received. The surface instruction may be a load, store, atomic, or reduction instruction to access a multi-dimension format graphics surface. The surface instruction may also be a query to obtain the surface attributes. At step 610, the x and y coordinates are extracted from the surface instruction. At step 615, the surface format information is used to convert the x and y coordinates into a generic address. At step 620, the generic address is converted into a physical memory address (via a virtual address). At step 625, samples corresponding to the x and y coordinates are used to access the multi-dimensional format surface.

Load from Surface Memory Instruction

The SULD is a load from surface memory instruction that uses a surface coordinate vector. The compute surface instruction loads data from the surface named by operand a at coordinates given by operand b into destination d. Operand a is a surface identifier. Coordinate operand b is a scalar or singleton tuple for 1D surfaces; is a two-element vector for 2D surfaces and array of 1D surfaces; and is a four-element vector for 3D surfaces and array of 2D surfaces, where the fourth element is ignored. Coordinates for .a1d and .a2d array geometries start with the array index i, followed by x and y. SULD.b performs an unformatted load of binary data. The lowest dimension coordinate represents a byte offset into the surface and is not scaled, and the size of the data transfer matches the size of destination operand d. Coordinate operand b can have optional X,Y,Z immediate offsets, written as x+1, y−2. Immediate offsets are signed 4 bit integers in the range −8 to +7 that are summed with the x,y,z register coordinates to form the effective coordinate location.

An example syntax for the SULD compute surface instruction is shown in TABLE 1.

TABLE 1

SULD compute surface instruction suld.b.geom{.cop}.vec.dtype.clamp d, [a, b]; //unformatted
suld.p.geom{.cop}.v4.dtype.clamp d, [a, b]; // formatted
.geom = { .1d, .2d, .3d, .a1d, .a2d };
.cop = { .ca, .cg, .cs, .lu, .cv }; // cache operation
.vec = { none, .v2, .v4 };
.dtype = { .b8, .b16, .b32, .b64 }; // for suld.b
.dtype = { .b32, .u32, .s32, .f32 }; // for suld.p
.clamp = { .trap, .clamp, .zero };

SULD.p performs a formatted load of a surface sample and returns a four-element vector of 32-bit values corresponding to R, G, B, and A components of the surface format. Destination vector elements corresponding to components that do not appear in the surface format are not written. The lowest dimension coordinate represents a sample offset rather than a byte offset.

If the destination type is .b32, the surface sample elements are converted to .u32, .s32, or .f32 based on the surface format as follows: If the surface format contains UNORM, SNORM, or FLOAT data, then .f32 is returned; if the surface format contains UINT data, then .u32 is returned; if the surface format contains SINT data, then .s32 is returned. If the destination base type is .u32, .s32, or .f32, size and type conversion is performed as needed to convert from the surface sample format to the destination type.

A surface base address is assumed to be aligned to a 16-byte address, and the address given by the coordinate vector must be naturally aligned to a multiple of the access size. If an address is not properly aligned, the resulting behavior is undefined; i.e., the access may proceed by silently masking off low-order address bits to achieve proper rounding, or the instruction may fault. The clamp field may be used to specify how to handle out-of-bounds addresses, where .trap causes an execution trap, .clamp loads data from the nearest surface edge location (sized appropriately), and .zero loads zero.

SULD loads data from pitch or blocklinear surfaces, loading 1 to 4 registers of sample data into d from coordinate tuple b for surface-id a. The amount of data to load is specified by .vec.dtype. For byte-addressing, (SULD.B-.geom), the optional X offset is scaled to the size of the data being loaded (.vec.dtype). The Y and Z offsets are not scaled for either byte or sample addressing.

Store to Surface Memory Compute Instruction

The SUST is the store to surface memory instruction that uses a surface coordinate vector. The instruction stores data from operand c to the surface named by operand a at coordinates given by operand b. Operand a is a surface identifier. Coordinate operand b is a scalar or singleton tuple for 1d surfaces; is a two-element vector for 2d surfaces and array of 1d surfaces; and is a four-element vector for 3d surfaces and array of 2d surfaces, where the fourth element is ignored. Coordinate elements are of type .s32. Coordinates for .a1d and .a2d array geometries start with the array index i, followed by x and y. Coordinate operand b can have optional X,Y,Z immediate offsets, written as x+1, y−2. Immediate offsets are signed 4 bit integers in the range −8 to +7 that are summed with the x,y,z register coordinates to form the effective coordinate location.

An example syntax for the SUST compute surface instruction is shown in TABLE 2.

TABLE 2

SUST compute surface instruction sust.b.geom{.cop}.vec.ctype.clamp [a, b], c; //unformatted
sust.p.geom{.cop}.vec.ctype.clamp [a, b], c; // formatted
.geom = { .1d, .2d, .3d, .a1d, .a2d };
.cop = { .wb, .cg, .cs, .wt };
.vec = { none, . v2, .v4 };
.ctype = { .b8 , .b16, .b32, .b64 }; // for sust.b
.ctype = { .b32, .u32, .s32, .f32 }; // for sust.p
.clamp = { .trap, .clamp, .zero };

sust.b performs an unformatted store of binary data. The lowest dimension coordinate represents a byte offset into the surface and is not scaled. The size of the data transfer matches the size of source operand c.

sust.p performs a formatted store of a vector of 32-bit data values to a surface sample. The source vector elements are interpreted left-to-right as R, G, B, and A surface components. These elements are written to the corresponding surface sample components. Source elements that do not occur in the surface sample are ignored. Surface sample components that do not occur in the source vector will be written with an unpredictable value. The lowest dimension coordinate represents a sample offset rather than a byte offset.

If the source type is .b32, the source data interpretation is based on the surface sample format as follows: If the surface format contains UNORM, SNORM, or FLOAT data, then .f32 is assumed; if the surface format contains UINT data, then .u32 is assumed; if the surface format contains SINT data, then .s32 is assumed. The source data is then converted from this type to the surface sample format. If the source base type is .u32, .s32, or .f32, size and type conversions are performed as needed between the surface sample format and the destination type.

A surface base address is assumed to be aligned to a 16-byte address, and the address given by the coordinate vector must be naturally aligned to a multiple of the access size. If an address is not properly aligned, the resulting behavior is undefined; i.e., the access may proceed by silently masking off low-order address bits to achieve proper rounding, or the instruction may fault.

SUST stores data to pitch or blocklinear surfaces. 1 to 4 registers of sample data are stored to coordinate address b for the surface with surface identifier a. The amount of data to store is specified by .vec.ctype.

The .clamp field specifies how to clamp out of bounds addresses (too high or low). The .ZERO (default) configures the SUST instruction to ignore SUST operations to out-of-bounds addresses. The .NEAR stores to the nearest edge sample in the surface. The TRAP indicates that an out-of-bounds address causes an execution trap. If the surface being accessed is disabled, the write will be silently dropped. When used in a pixel shader, SUST has helper pixels and killed pixels automatically predicated off by the SPM 310 to prevent unwanted writes to global memory. If the pixel's raster coverage is 0 or it has previously been killed using the KIL operation, the threads will not participate in any SUST operations.

Reduction to Surface Memory Compute Instruction

The SURED is the store to surface memory instruction that performs a reduction to surface memory using a surface coordinate vector. The instruction performs a reduction operation with data from operand c to the surface named by operand a at coordinates given by operand b. Operand a is a surface identifier. Coordinate operand b is a scalar or singleton tuple for 1D surfaces; is a two-element vector for 2D surfaces or arrays of 1D surfaces; and is a four-element vector for 3D surfaces or arrays of 2D surfaces, where the fourth element is ignored. Coordinate elements are of type .s32. Coordinates for .a1d and .a2d array geometries start with the array index i, followed by x and y. Coordinate operand b can have optional X,Y,Z immediate offsets, written as x+1, y−2. Immediate offsets are signed 4 bit integers in the range −8 to +7 that are summed with the x,y,z register coordinates to form the effective coordinate location.

An example syntax for the SURED compute surface instruction is shown in TABLE 3.

TABLE 3

SURED compute surface instruction sured.b.op.geom.ctype.clamp [a,b],c; // byte addressing
sured.p.op.geom.ctype.clamp [a,b],c; // sample addressing
.op = { .add, .min, .max, .and, .or };
.geom = { .1d, . 2d, .3d, .a1d, .a2d };
.ctype = { .u32, . u64, .s32, .b32 }; // for sured.b
.ctype = { .b32 };            // for sured.p
.clamp = { .trap, .clamp, .zero sured.b performs an unformatted reduction on .u32, .s32, .b32, or .u64 data. The lowest dimension coordinate represents a byte offset into the surface and is not scaled. Operations add applies to .u32, .u64, and .s32 types; min and max apply to .u32 and .s32 types; operations and/or apply to .b32 type.

sured.p performs a reduction on sample-addressed 32-bit data. The lowest dimension coordinate represents a sample offset rather than a byte offset. The instruction type is restricted to .b32, and the data is interpreted as .s32 or .u32 based on the surface sample format as follows: if the surface format contains UINT data, then .u32 is assumed; if the surface format contains SINT data, then .s32 is assumed.

A surface base address is assumed to be aligned to a 16-byte address, and the address given by the coordinate vector must be naturally aligned to a multiple of the access size. If an address is not properly aligned, the resulting behavior is undefined; i.e., the access may proceed by silently masking off low-order address bits to achieve proper rounding, or the instruction may fault.

The .clamp field specifies how to clamp out of bounds addresses (outside the surface). The TRAP indicates that an out-of-bounds address causes an execution trap. The .CLAMP configures the SURED instruction to perform a reduction to an out of bounds address at the nearest surface edge location, considering the coordinates as signed 32-bit values. The .ZERO drops operations to out-of-bounds addresses. If the surface being accessed is disabled, the write will be silently dropped.

The SURED compute surface instruction performs a reduction on pitch or blocklinear surfaces. Surfaces are stored in global memory. To compute the global address for a surface memory location, see SULEA. Note that there is no reverse mapping from a global address to its corresponding surface address. When used in a pixel shader, SURED has helper pixels and killed pixels automatically predicated off to prevent unwanted writes to global memory. If the pixel's raster coverage is 0 or it has previously been killed using the KIL operation, the threads will not participate in any SURED operations.

The SURED compute surface instruction operates on pitch or blocklinear surfaces, at coordinate address b for surface identifier a.

Query Surface Memory Compute Instruction

The SUQ surface instruction queries a surface attribute of a multi-dimension surface. Operand a is a surface identifier. When .query is specified as .width, SUQ surface instruction returns the width value of the surface in elements. When .query is specified as .height, SUQ surface instruction returns the height value of the surface in elements. When .query is specified as .depth, SUQ surface instruction returns the depth value of the surface in elements. SUQ may query additional surface attributes, including sample data format, sample size, component mask, and tiling block size.

An example syntax for the SUQ compute surface instruction is shown in TABLE 4.

TABLE 4

SULEA compute surface instruction a.suq.query.b32 d, [a]
b. .query = { .width, .height, .depth };

Load Effective Address Surface Memory Compute Instruction

The SULEA surface instruction returns an effective address of coordinate b in the surface specified by operand a. Surfaces can be multidimensional block-linear tiled memory surfaces with several properties. The SULD and SUST compute surface instructions load and store surface data. Using the address returned from the SULEA surface instruction makes it possible to use generic 64-bit addressing instructions such as CCTL.E, LD, ATOM or RED on surfaces as well.

An example syntax for the SULEA compute surface instruction is shown in TABLE 5.

TABLE 5

SULEA compute surface instruction a. sulea.b.geom.vec.dtype.clamp d, pd, [a, b]; //unformatted
b. sulea.p.geom.vec.dtype.clamp d, pd, [a, b]; // formatted
c. .geom = { .1d, .2d, .3d, .a1d, .a2d };
d. .vec = { none, . v2, .v4 };
e. .dtype = { .b8 , .b16, .b32, .b64 }; // for suld.b
f. .dtype = { .b32, .u32, .s32, .f32 }; // for suld.p
g. .clamp = { .trap, .near, .zero };

Coordinates for .a1d and .a2d array geometries start with the array index i, followed by x and y. Coordinate operand b can have optional X,Y,Z immediate offsets, written as x+1, y−2. Immediate offsets are signed 4 bit integers in the range −8 to +7 that are summed with the x,y,z register coordinates to form the effective coordinate location. For byte-addressing, (.B), the X offset is scaled to the size of the data being loaded (.dtype). The Y and Z offsets are not scaled for either byte or sample addressing. If .clamp is equal to .NEAR, the coordinates specified by operand b are interpreted as signed 32-bit integers. Other values for .clamp result in the coordinates being treated as unsigned 32-bit integers.

The SULEA compute surface instruction writes a 64-bit register containing the context virtual address that the surface address corresponds to. The address returned is compatible with the 64-bit extended addressing memory instructions (CCTL, LD, ST, ATOM, and RED). The address is computed the same way that the address of an SULD compute surface instruction is computed with the exception that all exceptions that occur during an SULEA's address computation are ignored when .clamp is equal to .ZERO or .NEAR (to accommodate a silently failing surface prefetch).

Operand pd is an optional predicate destination that indicates if the produced address is illegal. Pd is set to 0 if the address written to the destination operand d is a legal address. It is set to 1 if: a) out-of-range addressing errors occurred during computation. b).clamp equals .ZERO or .TRAP and the address required clamping. c) the surface being accessed is disabled.

Atomic Surface Memory Compute Instruction

The SUATOM surface instruction performs an atomic operation at coordinates b on surface a using value c, and returns the prior surface memory value in destination operand d. The SUATOM surface instruction supports pitch, block-linear, or arrays of surfaces. Surfaces and global memory co-exist in context virtual memory. To compute the virtual address for a surface memory location, see SULEA.: There is no reverse mapping from a virtual address to its corresponding surface address.

An example syntax for the SUATOM compute surface instruction is shown in TABLE 6.

TABLE 6

SUATOM compute surface instruction suatom.b.geom.op.dtype.clamp d, [a, b], c; //unformatted
suatom.p.geom.op.dtype.clamp d, [a, b], c; // formatted
.geom = { .1d, .2d, .3d, .a1d, .a2d };
.op = { .ADD, .MIN, .MAX, .INC, .DEC, .AND, .OR, .XOR, .EXCH };
.dtype = { .b8 , .b16, .b32, .b64 }; // for suld.b
.dtype = { .b32, .u32, .s32, .f32 }; // for suld.p
.clamp = { .trap, .near, .zero };

Coordinates for .a1d and .a2d array geometries start with the array index i, followed by x and y. Coordinate operand b can have optional X,Y,Z immediate offsets, written as x+1, y−2. Immediate offsets are signed 4 bit integers in the range −8 to +7 that are summed with the x,y,z register coordinates to form the effective coordinate location. When used in a pixel shader, SUATOM has helper pixels and killed pixels automatically predicated off to prevent unwanted writes to global memory. If the pixel's raster coverage is 0 or it has previously been killed using the KIL operation, the threads will not participate in any SUATOM operations. If .clamp is equal to .NEAR, the coordinates specified by b are interpreted as S32 integers. Other values for .clamp result in the coordinates being treated as U32 integers.

For byte-addressing, (SUATOM.B), the X offset is scaled to the size of the data being loaded (.dtype). The Y and Z offsets are not scaled for either byte or sample addressing. If .clamp is equal to .NEAR, the coordinates specified by operand b are interpreted as signed 32-bit integers. Other values for .clamp result in the coordinates being treated as unsigned 32-bit integers.

The .clamp field specifies how to clamp out of bounds addresses (too high or low). The .ZERO (default) configures the SUATOM instruction to ignore SUATOM operations to out-of-bounds addresses. The .NEAR accesses the nearest edge sample. The TRAP indicates that an out-of-bounds address causes an execution trap. If the surface being accessed is disabled, the atomic operation will be silently dropped and the destination will be written with a default value, such as all zeros.

These new surface instructions enable a compute program to access multi-dimensional formatted graphics surfaces that are stored in a user-specified data or pixel format and arranged in a graphics optimized layout. A set of surface memory access instructions e.g., surface load, store, reduce, and atomic, are configured to perform coordinate bounds checking is performed with configurable clamping. Caching operations may also be specified for the compute surface instructions. Data format conversion and packing to a specified storage format is supported for store, reduction, and atomic compute surface instructions. Data format conversion and unpacking from a specified storage format is supported for loads and atomics compute surface instructions.

Although the method steps are described in conjunction with the systems of FIGS. 1, 2, 3A, 3B, and 4, persons skilled in the art will understand that any system configured to perform the method steps, in any order, is within the scope of the inventions.

One embodiment of the invention may be implemented as a program product for use with a computer system. The program(s) of the program product define functions of the embodiments (including the methods described herein) and can be contained on a variety of computer-readable storage media. Illustrative computer-readable storage media include, but are not limited to: (i) non-writable storage media (e.g., read-only memory devices within a computer such as CD-ROM disks readable by a CD-ROM drive, flash memory, ROM chips or any type of solid-state non-volatile semiconductor memory) on which information is permanently stored; and (ii) writable storage media (e.g., floppy disks within a diskette drive or hard-disk drive or any type of solid-state random-access semiconductor memory) on which alterable information is stored.

The invention has been described above with reference to specific embodiments. Persons skilled in the art, however, will understand that various modifications and changes may be made thereto without departing from the broader spirit and scope of the invention as set forth in the appended claims. The foregoing description and drawings are, accordingly, to be regarded in an illustrative rather than a restrictive sense.

What is claimed is:

1. A method for accessing multi-dimensional formatted surface memory by a program, comprising:
receiving a surface instruction that specifies an x-coordinate of a sample and a y-coordinate of the sample, wherein the sample is associated with a multi-dimensional formatted surface;
computing an address of a location in the multi-dimensional formatted surface memory based on the x-coordinate, the y-coordinate, and attributes of the multi-dimensional formatted surface, by computing a plurality of address fields included in the address, wherein two or more address fields in the plurality of address fields comprise one or more bits corresponding to the x-coordinate and one or more bits corresponding to the y-coordinate; and
accessing the sample via the address;
wherein:
   a first address field in the plurality of address fields identifies a block within the multi-dimensional formatted surface, and
   a second address field in the plurality of address fields identifies a group of blocks (GOB) within the block.

2. The method of claim 1, wherein the surface instruction specifies the coordinates in bytes.

3. The method of claim 1, wherein the multi-dimensional formatted surface is configured by the program to access the samples in a pattern using multi-dimensional tiled addressing.

4. The method of claim 1, further comprising:
determining that the location is out-of-bounds of the multi-dimensional formatted surface; and
returning a default value for the surface instruction based on a mode specified by the surface instruction.

5. The method of claim 1, further comprising:
determining that the location is out-of-bounds of the multi-dimensional formatted surface; and
discarding the surface instruction based on a mode specified by the surface instruction.

6. The method of claim 1, further comprising:
determining that the location is out-of-bounds of the multi-dimensional formatted surface; and
reading data stored at a nearest location that is nearest to the location within the multi-dimensional formatted surface based on a mode specified by the surface instruction.

7. The method of claim 1, further comprising:
determining that the location is out-of-bounds of the multi-dimensional formatted surface; and
writing data to a nearest location that is nearest to the location within the multi-dimensional formatted surface based on a mode specified by the surface instruction.

8. The method of claim 1, further comprising caching data read from or written to the location based on a mode specified by the surface instruction.

9. The method of claim 1, further comprising:
receiving a second surface instruction that is configured to query an attribute of the multi-dimensional formatted surface; and
returning the attribute of the multi-dimensional formatted surface.

10. The method of claim 1, further comprising:
determining that the surface instruction is configured to store data to the multi-dimensional formatted surface; and
configuring a parallel thread processor that is coupled to the multi-dimensional formatted surface memory to convert the data to a format specified for the multi-dimensional formatted surface by the program before storing the data.

11. The method of claim 1, further comprising:
determining that the surface instruction is configured to load data from the multi-dimensional formatted surface; and
configuring a parallel thread processor that is coupled to the multi-dimensional formatted surface memory to convert the data from a format specified for the multi-dimensional formatted surface by the program before returning the data.

12. The method of claim 1, further comprising:
determining that the surface instruction is configured to perform an atomic operation on data from the multi-dimensional formatted surface; and
configuring a parallel thread processor that is coupled to the multi-dimensional formatted surface memory to convert the data from a format specified for the multi-dimensional formatted surface by the program before performing the atomic operation on the data.

13. The method of claim 1, further comprising:
determining that the surface instruction is configured to perform an atomic reduction operation on data from the multi-dimensional formatted surface; and
configuring a parallel thread processor that is coupled to the multi-dimensional formatted surface memory to convert the data from a format specified for the multi-dimensional formatted surface by the program before performing the atomic reduction operation on the data.

14. The method of claim 1, wherein the surface instruction is configured to load data from the multi-dimensional formatted surface, store data to the multi-dimensional formatted surface, query an attribute of the multi-dimensional formatted surface, perform an atomic operation on data from the multi-dimensional formatted surface, or perform an atomic reduction operation on data from the multi-dimensional formatted surface.

15. The method of claim 1, wherein the surface instruction comprises a query to obtain the attributes of the multi-dimensional formatted surface.

16. The method of claim 1, wherein a third address field in the plurality of address fields identifies a cache line in the GOB.

17. The method of claim 16, wherein a fourth address field in the plurality of address fields identifies a sector in the cache line.

18. The method of claim 17, wherein a fifth address field in the plurality of address fields identifies a byte in the sector.

19. A non-transitory computer-readable storage medium storing instructions that, when executed by a processor, cause the processor executing a program to access a multi-dimensional formatted surface memory, by performing the steps of:
receiving a surface instruction that specifies an x-coordinate of a sample and a y-coordinate of the sample, wherein the sample is associated with a multi-dimensional formatted surface;
computing an address of a location in the multi-dimensional formatted surface memory based on the x-coordinate, the y-coordinate, and attributes of the multi-dimensional formatted surface, by computing a plurality of address fields included in the address, wherein two or more address fields in the plurality of address fields comprise one or more bits corresponding to the x-coordinate and one or more bits corresponding to the y-coordinate; and
accessing the sample via the address;
wherein:
   a first address field in the plurality of address fields identifies a block within the multi-dimensional formatted surface, and
   a second address field in the plurality of address fields identifies a group of blocks (GOB) within the block.

20. A computer-readable storage medium of claim 19, wherein the surface instruction specifies the coordinates in bytes.

21. A computer-readable storage medium of claim 19, wherein the multi-dimensional formatted surface is configured by the program to access the samples in a pattern using multi-dimensional tiled addressing.

22. A computer-readable storage medium of claim 19, further comprising:
   determining that the location is out-of-bounds of the multi-dimensional formatted surface; and
   returning a default value for the instruction based on a mode specified by the surface instruction.

23. A computer-readable storage medium of claim 19, further comprising caching data read from or written to the location based on a mode specified by the surface instruction.

24. The non-transitory computer-readable storage medium of claim 19, wherein the surface instruction comprises a query to obtain the attributes of the multi-dimensional formatted surface.

25. A system comprising:
   a multi-dimensional formatted surface memory; and
   a parallel thread processor coupled to the multi-dimensional formatted surface memory and configured to:
      receive a surface instruction that specifies an x-coordinate of a sample and a y-coordinate of the sample, wherein the sample is associated with a multi-dimensional formatted surface;
      compute an address of a location in the multi-dimensional formatted surface memory based on the x-coordinate, the y-coordinate, and attributes of the multi-dimensional formatted surface, by computing a plurality of address fields included in the address, wherein two or more address fields in the plurality of address fields comprise one or more bits corresponding to the x-coordinate and one or more bits corresponding to the y-coordinate; and
      access the sample via the address;
      wherein:
         a first address field in the plurality of address fields identifies a block within the multi-dimensional formatted surface, and
         a second address field in the plurality of address fields identifies a group of blocks (GOB) within the block.

26. The system of claim 25, wherein the surface instruction comprises a query to obtain the attributes of the multi-dimensional formatted surface.

27. A method for accessing multi-dimensional formatted surface memory by a program, comprising:
   receiving a surface instruction that specifies an x-coordinate of a sample and a y-coordinate of the sample, wherein the sample is associated with a multidimensional formatted surface;
   computing an address of a location in the multi-dimensional formatted surface memory based on the x-coordinate, the y-coordinate, and attributes of the multi-dimensional formatted surface, by computing a plurality of address fields included in the address, wherein two or more address fields in the plurality of address fields comprise one or more bits corresponding to the x-coordinate and one or more bits corresponding to the y-coordinate; and accessing the sample via the address;
   wherein:
   a first address field in the plurality of address fields identifies a block within the multi-dimensional formatted surface and is computed based on a first bit corresponding to the x-coordinate and a first bit corresponding to the y-coordinate,
   a second address field in the plurality of address fields identifies a group of blocks (GOB) within the block and is computed based on a second bit corresponding to the x-coordinate and a second bit corresponding to the y-coordinate,
   a third address field in the plurality of address fields identifies a cache line in the GOB and is computed based on a third bit corresponding to the x-coordinate and a third bit corresponding to the y-coordinate,
   a fourth address field in the plurality of address fields identifies a sector in the cache line and is computed based on a fourth bit corresponding to the x-coordinate and a fourth bit corresponding to the y-coordinate, and
   a fifth address field in the plurality of address fields identifies a byte in the sector and is computed based on a fifth bit corresponding to the x-coordinate and a fifth bit corresponding to the y-coordinate.

* * * * *